(No Model.)
F. V. DE COPPET.
PROCESS OF AND APPARATUS FOR MAKING ICE.
No. 309,442. Patented Dec. 16, 1884.
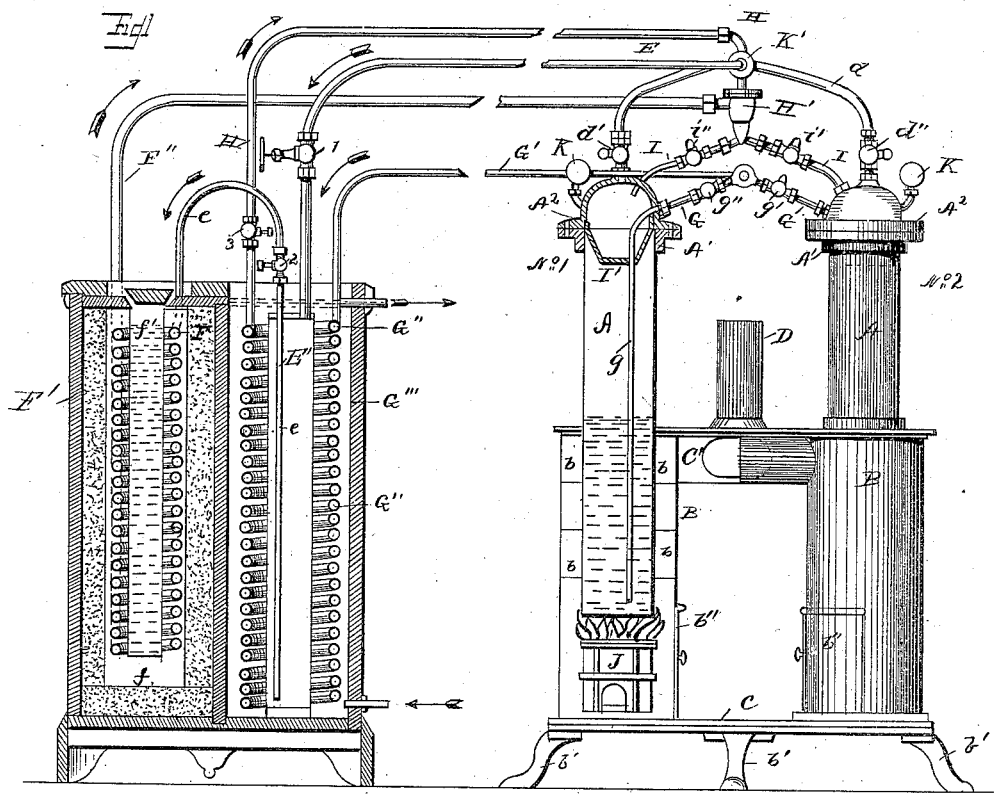
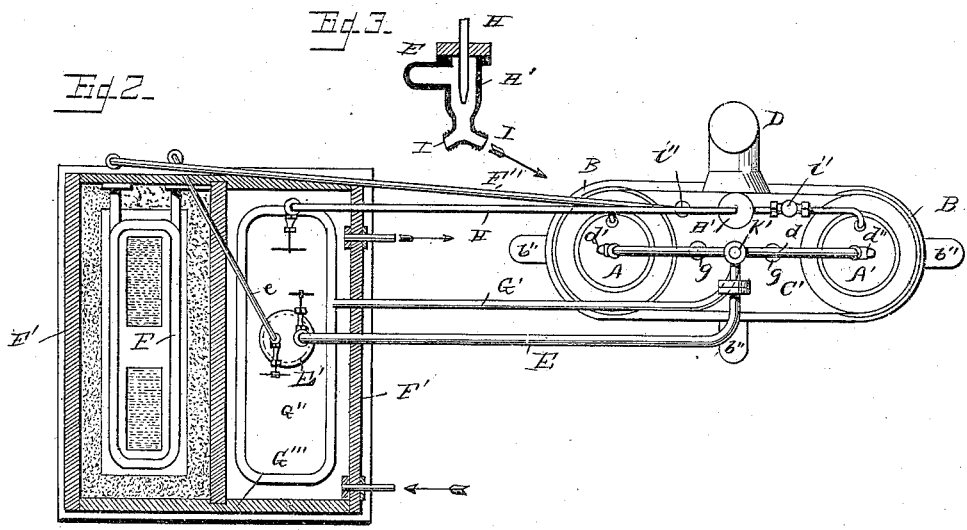
WITNESSES
F. L. Ourand
C. G. Trevitt
INVENTOR
F. V. De Coppet
By H. N. Jenkins
Attorney

UNITED STATES PATENT OFFICE.

FRANCIS V. DE COPPET, OF NEW ORLEANS, LOUISIANA.

PROCESS OF AND APPARATUS FOR MAKING ICE.

SPECIFICATION forming part of Letters Patent No. 309,442, dated December 16, 1884.

Application filed April 1, 1884. (No model.)

*To all whom it may concern:*

Be it known that I, FRANCIS V. DE COPPET, a citizen of the United States, residing at New Orleans, in the parish of Orleans and State of Louisiana, have invented a new and useful Improvement in Process of and Apparatus for Making Ice, of which the following is a full, clear, and exact description, reference being had to the annexed drawings, in which the machine is represented as having twin retorts or generators. A greater number may, however, be employed, if so desired, without departing from the spirit of the invention.

Figure 1 is a longitudinal elevation of my machine, part of which is shown in section. Fig. 2 is a plan or top view of same, and Fig. 3 a sectional view of the absorber.

My improvement relates to that class of ice-machines in which ammonia is used in solution with water, and now known as the "chemical affinity" or "absorption" system, and has reference to a machine for the production of ice on a small scale for domestic purposes, or where small quantities of ice are required at intervals of time, and where the apparatus is not required to be kept in continuous operation, as in the larger machines.

The same letters of reference indicate identical parts in all of the figures.

In Fig. 1, A A are the generators, or "retorts," as they are called, which are made of extra heavy wrought-iron, steel tubes, or other suitable material, with a bottom welded, riveted, or cast to the same, and fitted at the top with a collar, A' A', which is screwed or otherwise fastened upon body of retort, and a cap, A² A², one of which is shown in section. B B are cast or wrought-iron casings, supported upon a platform, C, fitted with legs $b'$, and united at the top by the smoke-channel C', upon which the retorts rest or are supported. These casings are fitted internally with spiral passages $b\ b\ b\ b$, fitting around the retorts, the object of which is to increase the heating-surface.

D is the smoke-pipe for the escape of gases. $b''\ b''$ are fire-doors. The caps A² are fitted at their highest part with a pipe, $d$, bearing a check-valve at each end, $d'\ d''$; they are connected together and fitted with a flange or other gas-tight union-joint to a pipe, E, which I shall call the "compression-pipe," so as to distinguish it from the others. The pipe E leads into and is connected to a vessel, E', formed of an extra heavy pipe welded at both ends, which performs the part of liquefier and recipient for the liquefied gas. It is fitted, also, with a dip-tube, $e$, reaching near the bottom of said vessel. This tube continues out and connects at the top with the evaporator-coil F, which lies in the freezing box-tank F'.

$f$ is a water-tight casing containing said coil, which is immersed in an uncongealable liquid.

$f'\ f'$ are cans containing water to be frozen or other substances to be cooled.

F'' is the expansion-pipe connected at the bottom of evaporator-coil, through which the volatilized gas returns to the retort.

G G are branches of the poor-liquor pipe, each bearing a check-valve, $g'\ g''$, and connected each to a dip-tube, $g\ g$, leading near the bottom of retorts, as shown.

G' is a pipe connecting the two pipes or branches G G, and leading the poor liquor at the top of and into the cooler-coil G''. This coil is placed in a water-tight casing, G''', fitting closely into freezing-tank F'.

H is a pipe emerging from and connected to the outlet end, and a top of cooler-coil, through which the poor liquor from the retort, in passing through the cooler-coil after becoming thoroughly cold, is forced into the absorber H', and where, in coming into contact with the volatilized gas issuing from evaporator-coil F, it reabsorbs or takes up all of the gas which it originally contained in retort No. 1.

I I are pipes connected to each branch or nozzle of the absorber H', and bearing the check-valves $i'\ i''$. Said pipes project inside of the caps of retorts, as shown.

I' I' is a perforated basket fastened into the cap, which is intended to intercept or arrest any watery vapors or foaming of the liquor from passing into the compression-pipe E. The pipes E, $e$, and H are each fitted with a globe valve or cock, 1, 2, and 3, by means of which the apparatus may be controlled or regulated.

J is a portable furnace for heating the retorts, which also may be heated in any suitable manner.

The poor-liquor pipe H may be arranged so as to branch off into the top of each retort, when the liquor may be sprayed over the gas without going through the absorber. The expansion-pipe F''' may also be arranged in the same manner, and thus dispense also with the absorber H'; but I prefer to make use of the arrangement shown and described. The caps A² are also fitted with a pressure-gage, K K. A safety-valve, K', may also be placed upon compression-pipe E, and set so as to open itself when a certain pressure is reached. The gas escaping from safety-valve may be conducted through a pipe into a water-vessel and saved.

My apparatus, as herein shown and described, is heated by direct fire, and is intended for places where no steam is used; but it is evident that I can use steam to heat the retorts, and thus dispense with the fire-casings or stoves and furnaces.

To operate my apparatus I proceed as follows: The retorts and all their connections having been thoroughly tested to insure tightness of parts, and having been freed of air, I introduce into retort No. 1 a very strong and concentrated solution of aqua-ammonia until it reaches about midway up into the retort, as shown. I close globe-valves 2 and 3 and open wide globe-valve 1. Then I pour into freezing-tank casing the uncongealable solution. Next I put fresh water into the cans $f'$ $f'$ and introduce ordinary cooling-water into casing of cooler-coil G'' until it overflows through outlet-pipe at top of box. I then light the furnace and place it under retort No. 1. The heat will in a short time drive out nearly all the gas from the concentrated solution in retort and force it through compression-pipe E into the liquefier, where, under the double influence of the pressure and cold water, the gas becomes liquefied whenever a fourth or fifth of the volume of original solution in retort No. 1 has been removed by liquefaction—a fact which may readily be ascertained by ordinary methods. I then remove the furnace from under the retort No. 1, then close globe-valve 1 on pipe E. I open slightly globe-valves 2 and 3 of pipes $e$ and H. The liquefied gas under pressure in liquefier will rush out of valve 2 and enter the evaporator-coil F, where, in expanding, it produces great cold, and brings the uncongealable bath several degrees below the freezing-point. The result is that the water in cans $f'$ $f'$ becomes frozen. The volatilized gas comes out at bottom of coil and flows into expansion-pipe F''' until it enters the absorber H'. In the meantime the poor liquor, which is left under pressure in retort No. 1, rushes out into the cooler-coil, where it becomes thoroughly cold and in a fit condition to take up all the gas which it gave out in the retort. It then passes out of valve 3 and pipe H into the conical pipe inside of absorber, where, in meeting the expanded gas, an instantaneous absorption takes place. The now enriched liquor opens the check-valve $i'$ on pipe I of retort No. 2, and enters said retort, which is empty and free of pressure, until all the liquefied gas in liquefier and poor liquor in retort No. 1 are expanded.

The check-valves $d'$ $d''$ and $g'$ $g''$ on retorts No. 1 and No. 2 are all set alike, so as to open themselves automatically from pressure of retorts, while $i'$ $i''$ are set so as to open themselves automatically from the pressure of liquefier and evaporator-coil, or in an opposite direction. For instance, when retort No. 1 is under pressure, check-valves $d'$ and $g''$ are open and check-valve $i''$ closed, while the check-valves $d''$ and $g'$ on retort No. 2, which is empty, are closed, and $i'$ on retort No. 2 is open.

To repeat the operation with retort No. 2, the same rules and directions are to be observed as with No. 1.

The advantages derived by the use of my apparatus over others are important. For instance, I am enabled to make solid ice without the expenditure of any mechanical power of any kind, doing away with heavy wear and tear, and with the simple agency of heat and pressure to operate the apparatus.

I am aware that intermittent ice-machines have been made in which aqua-ammonia has been used as the freezing medium by separating the gas from the water by direct heat; but the trouble has been found in the difficulty of getting the apparatus to work until the solution in retort was thoroughly cooled and the pressure removed, which had to be done by placing the retort in cold water, or by running cold water around and inside of a coil placed in the solution, which caused unequal expansion, and consequent leakages of gas, and therefore great delay in the freezing operation. I am enabled with my apparatus to obviate all these difficulties, and to work expeditiously, to freeze as soon as the gas begins to liquefy, or repeat the operation as often as desired, thus saving time, labor, and fuel, with only slight intermission between each freezing operation, the apparatus working automatically and without the use of skilled labor.

Having described my invention, what I claim as new and useful, and desire to secure by Letters Patent, is—

1. In the manufacture of ice, the process herein described of absorbing and storing ammonia in water, which consists in conveying automatically the products of absorption by means of the direct pressure of the poor liquid from a heated retort into one or more empty ones, where no pressure exists, the latter retorts adapted to be heated subsequently, so as to repeat the operation, substantially as and for the purpose set forth.

2. In that class of ice-machines in which ammonia is used, the herein-described arrangement of one or more retorts, each having a separate furnace or heating-casing, and one of which is charged when the other is empty, substantially as and for the purpose set forth.

3. The combination of twin retorts A A, provided with casings B B and furnace J, the dip-tubes $g\ g$, branch pipes G G', check-valves $g'\ g''$, pressure-pipes $d\ d$, having check-valves $d'\ d''$, pressure-pipe E, and globe-valve 1 and safety-valve K, substantially as and for the purpose set forth.

4. The combination, with retorts A A, of poor-liquor pipe G', as connected to branch pipes G G, with cooler-coil G'', return-pipe for poor liquor, H, fitted with valve 3, in connection with or without absorber H', substantially as and for the purpose specified and set forth.

5. The combination of liquefier E', provided with casing G''', and the dip-tube $e$, having valve 2, connected to evaporator-coil F, expansion-pipe F'', the absorber H', branch pipe H, and check-valves $i'\ i''$, arranged as described, and for the purpose set forth.

6. The combination of portable freezing-box F', provided with coils G'' and F, water-cans $f\ f$, and pipes F'', H, E, G, and $e$, all connected and arranged as and for the purpose specified.

F. V. DE COPPET.

Witnesses:
W. T. WATERS,
S. B. STONE.